US009152670B2

(12) United States Patent
Ghazal et al.

(10) Patent No.: US 9,152,670 B2
(45) Date of Patent: Oct. 6, 2015

(54) ESTIMATING NUMBER OF ITERATIONS OR SELF JOINS REQUIRED TO EVALUATE ITERATIVE OR RECURSIVE DATABASE QUERIES

(71) Applicant: Teradata Corporation, Dayton, OH (US)

(72) Inventors: Ahmad Said Ghazal, Redondo Beach, CA (US); Dawit Seid, Cary, NC (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 13/722,133

(22) Filed: Dec. 20, 2012

(65) Prior Publication Data

US 2014/0181074 A1    Jun. 26, 2014

(51) Int. Cl.
*G06F 17/30* (2006.01)
(52) U.S. Cl.
CPC ............................. *G06F 17/30463* (2013.01)
(58) Field of Classification Search
CPC ................................................. G06F 17/30463
USPC .......................................................... 707/718
See application file for complete search history.

(56) References Cited

U.S. PATENT DOCUMENTS 5,752,241 A    5/1998  Cohen

OTHER PUBLICATIONS

Agrawal, Rakesh, and H. V. Jagadish. "Direct Algorithms for Computing the Transitive Closure of Database Relations." VLDB. vol. 87. 1987.*

Wolfson, Ouri, et al. "Parallel processing of graph reachability in databases." International Journal of Parallel Programming 21.4 (1992): 269-302.*
Ghazal, Ahmad, et al. "Adaptive optimizations of recursive queries in teradata." Proceedings of the 2012 ACM SIGMOD International Conference on Management of Data. ACM, 2012.*
Ghazal, Ahmad, Alain Crolotte, and Dawit Seid. "Recursive sql query optimization with k-iteration lookahead." Database and Expert Systems Applications. Springer Berlin Heidelberg, 2006.*
Toroslu, Ismail H., and Ghassan Z. Qadah. "The strong partial transitive-closure problem: algorithms and performance evaluation." Knowledge and Data Engineering, IEEE Transactions on 8.4 (1996): 617-629.*
Webwhompers, Graph Theory, 2010.*
"Query Size Estimation by Adaptive Sampling", Journal of Computer and System Sciences, 51 (1), 18-25, 1995, by R.J Lipton.
"Size-Estimation Framework With Applications to Transitive Closure and Reachability", Journal of Computer and System Sciences, vol. 55, pp. 441-453, Dec. 1997 by Edith Cohen.

* cited by examiner

*Primary Examiner* — William Spieler
(74) *Attorney, Agent, or Firm* — Ramin Mahboubian

(57) ABSTRACT

The number of iterations or self joins required to execute a recursive database query can be estimated. It will be appreciated that this estimation can be used to plan the execution of the recursive query and can be made in various ways and for various applications. By way of example, an estimated number of iterations or self joins required to execute a recursive database query (e.g., 12) can be used as a basis to determine or plan an optimal execution plan. For example, given an estimated twelve (12) iterations, an execution plan can be determined for executing at least the first three (3) iterations or for executing every three (3) iterations, whereas for an estimated twenty (21) iterations required to complete a recursive database query, an execution plan can be determined for the first five (5) or six (6) iterations, and so on.

10 Claims, 5 Drawing Sheets

```
CREATE RECURSIVE VIEW all_trips (source, destination) AS SELECT dep_city,
arr_city FROM Flights
UNION ALL
SELECT  results_before.source, next_leg.arr_city
FROM  all_trips results_before, Flights next_leg
WHERE reults_before.destination=next_leg.dep_city;
```

FIG. 1

*Procedure ExecuteAllTrips*

*Begin*

1. *Retrieve from Flights table into Spool 1 and Spool 2.*
2. *Join Flights with Spool 2.*
3. *If join result is empty go to step 7.*
4. *Empty Spool 2 and then set it to the join result.*
5. *Spool 1 = Spool 1 UNION join result.*
6. *Go to step 2.*
7. *Final result = Spool 1*

*End*

FIG. 2

ESTIMATING NUMBER OF ITERATIONS OR SELF JOINS REQUIRED TO EVALUATE ITERATIVE OR RECURSIVE DATABASE QUERIES

BACKGROUND

Data can be an abstract term. In the context of computing environments and systems, data can generally encompass all forms of information storable in a computer readable medium (e.g., memory, hard disk). Data, and in particular, one or more instances of data can also be referred to as data object(s). As is generally known in the art, a data object can, for example, be an actual instance of data, a class, a type, or a particular form of data, and so on.

The term database can also refer to a collection of data and/or data structures typically stored in a digital form. Data can be stored in a database for various reasons and to serve various entities or "users." Generally, data stored in the database can be used by one or more the "database users." A user of a database can, for example, be a person, a database administrator, a computer application designed to interact with a database, etc. A very simple database or database system can, for example, be provided on a Personal Computer (PC) by storing data (e.g., contact information) on a Hard Disk and executing a computer program that allows access to the data. The executable computer program can be referred to as a database program, or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and are used in various business and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DBM) or a Database Management System (DBMS) is provided for relatively large and/or complex databases. As known in the art, a DBMS can effectively manage the database or data stored in a database, and serve as an interface for the users of the database. For example, a DBMS can be provided as an executable computer program (or software) product as is also known in the art.

It should also be noted that a database can be organized in accordance with a Data Model. Some notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation Language, and a Query Language.

Today, databases have become prevalent in virtually all aspects of business and personal life. Moreover, usage of various forms of databases is likely to continue to grow even more rapidly and widely across all aspects of commerce, social and personal activities. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A current popular type of database is the relational database with a Relational Database Management System (RDBMS), which can include relational tables (also referred to as relations) made up of rows and columns (also referred to as tuples and attributes). In a relational database, each row represents an occurrence of an entity defined by a table, with an entity, for example, being a person, place, thing, or another object about which the table includes information.

One important objective of databases, and in particular a DBMS, is to optimize the performance of queries for access and manipulation of data stored in the database. Given a target environment, an "optimal" query plan can be selected as the best option by a database optimizer (or optimizer). Ideally, an optimal query plan is a plan with the lowest cost (e.g., lowest response time, lowest CPU and/or I/O processing cost, lowest network processing cost). The response time can be the amount of time it takes to complete the execution of a database operation, including a database request (e.g., a database query) in a given system. In this context, a "workload" can be a set of requests, which may include queries or utilities, such as, load that have some common characteristics, such as, for example, application, source of request, type of query, priority, response time goals, etc.

As those skilled in the art readily appreciate, generally, optimization of database queries presents many challenges. In particular, optimization of iterative (or recursive) database queries (RQ's) poses more serious and difficult challenges, where a database query has to be computed as a series of iterations (or iterative operations) where the result of a first iteration is needed to compute the result of second iteration, and so on. It should be noted that queries requiring such iterative steps are also known, for example, as recursive queries in the context of the ANSI standard as generally known in the art.

In view of the foregoing, it should be noted that techniques for optimization of iterative queries (e.g., recursive queries of the ANSI standard) of database systems and environments are highly useful.

SUMMARY

Broadly speaking, the invention relates to computing environments and systems. More particularly, the invention relates to techniques for optimization of iterative or recursive database queries in database systems.

In accordance with one aspect of the invention, the number of iterations or self joins required to execute a recursive database query can be estimated. It will be appreciated that this estimation can be used to plan the execution of the recursive query and can be made in various ways and for various applications. By way of example, an estimated number of iterations or self joins required to execute a recursive database query (e.g., 12) can be used as a basis to determine or plan an optimal execution plan. For example, given an estimated twelve (12) iterations, an execution plan can be determined for executing at least the first three (3) iterations or for executing every there (3) iterations, whereas for an estimated twenty (21) iterations required to complete a recursive database query, an execution plan can be determined for the first five (5) or six (6) iterations, and so on.

BRIEF DESCRIPTION OF THE DRAWINGS

The present invention will be readily understood by the following detailed description in conjunction with the accompanying drawings, wherein like reference numerals designate like structural elements, and in which:

FIG. 1 depicts a very simplified example of an iterative query as a "Recursive View all-trips" designed to obtain all flights between source and destinations cities.

FIG. 2 depicts a very simplified procedure "ExecuteAll-Trips" to demonstrate a highly simplified implementation of executing the "Recursive View all-trips" shown in FIG. 1.

To elaborate even further.

DETAILED DESCRIPTION

Figure 3:
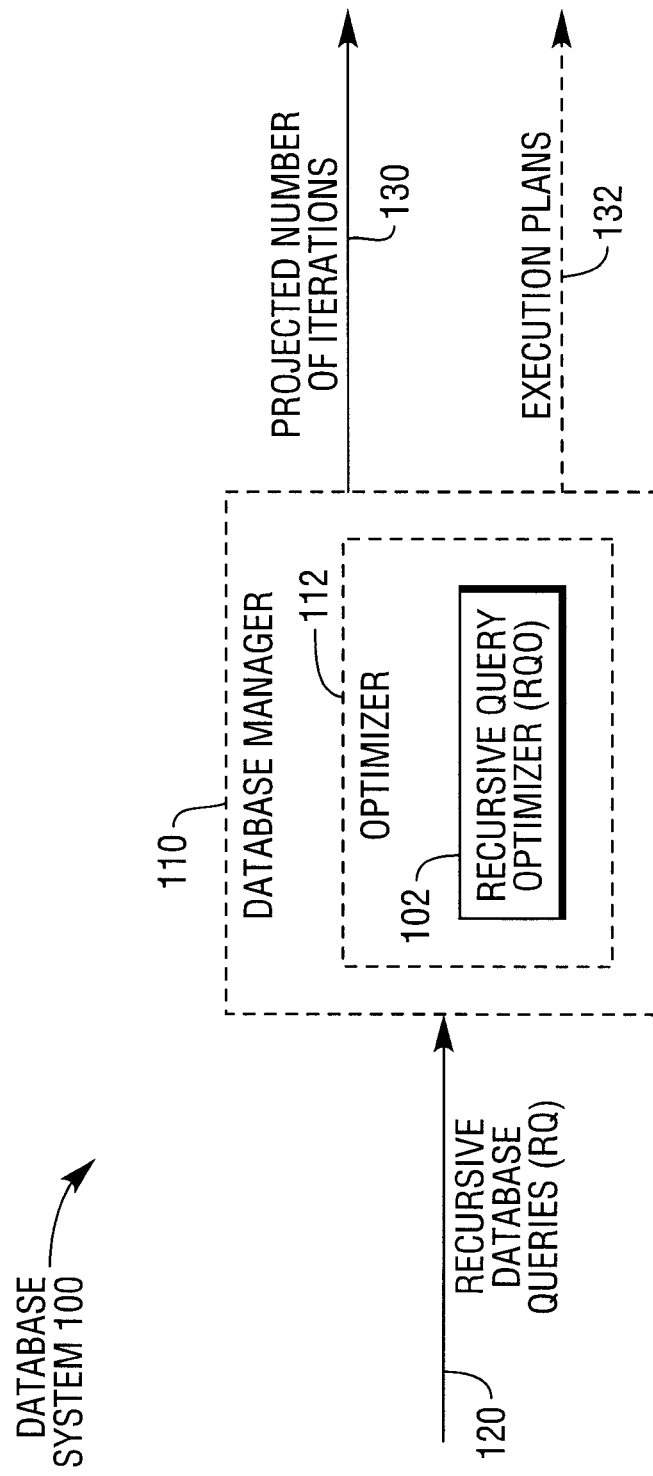
FIG. 3 depicts a database system that includes a Recursive Query Optimizer (RQO) in accordance with one embodiment of the invention.

As noted in the background section, techniques for optimization of iterative queries (e.g., recursive queries of the ANSI standard) of database systems and environments are highly useful. However, optimization of iterative queries poses even more difficult challenges partly because the result of an iteration (or sub-query) is dependent on a previous iteration (or previous sub-query) preceding it, but the same execution plans may not be optimal for executing both of the iterations (or sub-queries). In other words, different iterations may exhibit different cardinalities (results or result sizes, including intermediate results or sizes) and therefore require different optimal execution plans for executing each one of the iterations. However, conventionally, execution plans are determined statically, where an optimal plan is determined for the first iteration and followed for the proceeding iterations despite the suitability of the plan. In other words, cardinalities of the proceeding iterations are not considered in static query optimization techniques.

To further elaborate, FIG. 1 depicts a very simplified example of an iterative query as a "Recursive View all-trips" designed to obtain all flights between source and destinations cities. As this example shows, multiple iterative sub-queries are required in a table of flights with at least a source and destination entries between two cities with a direct flight, where the first source (e.g., San Diego) would give a first destination (e.g., Las Vegas) in a first iteration (or first sub-query), and wherein in a second iteration (or second subquery) predicted on the first iteration, the first destination would become a second source (e.g., Las Vegas) to compute a second destination (e.g., Detroit), and so on. Although this simple example may not be fully illustrative, an ordinary person may better understand the problems associated with iterative database queries in noting that a second iteration may have significantly different characteristics as the number of outgoing flights from San Diego could widely differ from Las Vegas or New York, and so on.

FIG. 2 depicts a very simplified procedure "ExecuteAll-Trips" to demonstrate a highly simplified implementation of executing the "Recursive View all-trips" shown in FIG. 1. Referring to FIG. 2, the steps 1-7 can, for example, be generated by an optimizer and executed by what may be called an "execution engine" as generally known in the art. The first step corresponds to performing a seed part (first SELECT). It can produce an initial result and feed it into the recursion or recursive steps 2-6. In the context, Spool 2 can be used to hold a "running seed" (or the recursive result of each iteration) which can then become part of a cumulative result held in spool 1. The final result can be represented as a "UNION" of the initial seed and the running seeds as those skilled in the art will readily appreciate.

In the example shown in FIG. 2, simply put, an optimizer would need to find the best way to perform the seed and recursive steps based on cost estimates. For example, in step 1, the optimizer may find an index access to the Flights stored in a Flights table. In step 1, the optimizer may also finds the best join method to join the Flights (or join the Flights table with itself) with Spool 2. Of course, for a practical application, and in particular for relatively more complex queries, the join plan for Step 2 can be very highly involved than the example shown in FIG. 2 would suggest.

Using the example of FIG. 2, it should be noted that conventionally a static plan in step 2 is determined based on the estimated cardinalities (i.e. cardinality statistics) of Spool 2 computed once and when the execution plan is first created. These statistics can basically be the outcome of the seed step (step 1) in the example shown in FIG. 2. Hence, the execution plan can be optimal for the first iteration of the recursive execution but may not be optimal for the subsequent iterations. One reason for this is that cardinality statistics of Spool 2 may change very significantly during the recursive execution rendering the initial plan non-optimal. For example, as the cardinality of Spool 2 changes from iteration i to iteration i+1, it is possible that "hash join" is determined to be the optimal way to join Flights to Spool 2 in i-th iteration but "merge join" could be the optimal way to do the join at the i+1th iteration.

In one approach, cardinality statistics can be collected and provided as feedback to address the inefficiency of the static planning schemes. In other words, after completion of an iteration of a recursive query, actual statistics can be taken and used in order to plan or re-plan the execution of the next iteration. This feedback process can be repeated at each iteration until all iterations of the recursive query have been completed in order to address the problem of static planning schemes where the same execution plan is used for all of the iterations. However, at least in some systems, including parallel systems (e.g., DBMS of a Teradata system) such full feedback solution may not be optimal as providing feedback at each iteration and re-planning can interrupt execution and the pipelining across iterations. Also, global query optimizations (for steps of different iterations), where common components of multiple execution plans are isolated and executed only once to avoid redundant repetition, may not be possible with a technique using feedback at each iteration (full feedback) given that the execution plans may not be known upfront. In view of the foregoing, improved techniques for generating plans for execution of recursive database queries are needed and would be very useful.

In view of the foregoing, improved techniques for execution of recursive database queries are needed and would be very useful.

Accordingly, it will be appreciated that the number of iterations or self joins required to execute a recursive database query can be estimated in accordance with one aspect of the invention. It will also be appreciated that this estimation can be used to plan the execution of the recursive query and can be made in various ways and for various applications. By way of example, an estimated number of iterations or self joins required to execute a recursive database query (e.g., 12) can be used as a basis to determine or plan an optimal execution plan. For example, given an estimated twelve (12) iterations, an execution plan can be determined for executing at least the first three (3) iterations or for executing every three (3) iterations, whereas for an estimated twenty (21) iterations required to complete a recursive database query, an execution plan can be determined for the first five (5) or six (6) iterations, and so on.

Embodiments of these aspects of the invention are also discussed below with reference to FIGS. 3-6. However, those skilled in the art will readily appreciate that the detailed description given herein with respect to these figures is for explanatory purposes as the invention extends beyond these limited embodiments.

FIG. 3 depicts a database system 100 that includes a Recursive Query Optimizer (RQO) 102 in accordance with one embodiment of the invention. As suggested by FIG. 3, the database system 100 may also include a database manager 110 (e.g., Database Management System (DBMS), a Relational Database Management System (RDBMS)) that effectively manages a database 101. As such, RQO 102 can, for example, be provided as a part of the database manager 110. More particularly, it will be appreciated that the RQO 102 can, for example, be provided as a part of an optimizer 112 in the database manager 110. Of course, the RQO 102 can be provided as a separate component. Furthermore, it is not necessary to use a database manager 110 and/or optimizer 112 as RQO 102 can be configured and can operate independently and separately as those skilled in the art will also readily appreciate.

Those skilled in the art will also readily appreciate that RQO 102 can be implemented at least partly as a computer executable program. For example, RQO 102 can be provided as executable computer code stored in memory (not shown) and executed by one or more processors (not shown).

In any case, RQO 102 can estimate a projected number of iterations 130 for the (total) number of iterations required to execute a recursive database query 120. Typically, a recursive database query 120 requires multiple sub-queries to be executed as multiple iterations such that a result of a first one of the sub-queries is needed to be determined in a first iteration of the iterations of the recursive database query 120 in order to determine the result of a second one of the sub-quires in a second iteration to be performed after the first iteration. It will be appreciated that the expected number of iterations required to execute the recursive database query 120A can be a very useful measure in determining an effective and/or optimal execution plan for executing the recursive database query 120A. As such, as an estimated measure of the expected number of iterations required to execute the recursive database query 120A, the projected number of iterations 130, estimated by the RQO 102, can be used to generate one or more execution plans 132 for executing one or more iterations of the recursive query 120. An execution plan for executing one or more iterations of the recursive query 120 can be generated based on the projected number of iterations required to execute the recursive query 120 by the RQ 102 itself or by another component (not shown) or a combination therefore, as those skilled in the art will readily appreciate.

Generally, an estimation of the expected number of iterations required to execute a recursive database query, and/or the expected number of self joins of a recursive query, can be used in various ways and for various applications. For example, the estimation can be used in determining the optimal number of iterations that a query optimizer should generate "look-ahead" execution plans (e.g., two (2) iterations, five (5) iterations in an effort to minimize the cost associated with the planning). In one approach, the cost associated with planning can be reduced by first estimating the expected number of iterations (ENI) of a recursive query and then generating a plan for a fraction of the expected number of iterations ENI. In other words, the number of execution plans to be generated for a recursive database query can, for example, be computed as ENI/r, where r is a constant that is set, for example, by a database administrator (DBA).

Those skilled in the art will readily appreciate that the recursive query 120 can be represented as one or more recursion trees. As such, RQO 102 can estimate the projected number of iterations, for example, by determining the projected number of iterations at least partly based on one or more of the following: (i) an estimated number of all nodes in one or more recursion trees (I) that represent the organization of data involved in the recursive database query 120, (ii) the number of nodes in the one or more recursion trees (S) that originate at a seed provided as input of the recursive database query 120, and (iii) an estimated average of the outgoing edges of the nodes of the one or more recursion trees ("Avg_outDegree").

The projected number of iterations can, for example, be determined at least partly based on the ratio of the estimated number of all nodes and a product of the seed and the Avg_outDegree (I/(S*Avg_outDegree)).

It should be noted that the estimated number of all nodes in one or more recursion trees (I) that represent the organization of data involved in the database query over a graph table with columns C1 and C2 can be, for example, determined at least partly based on one or more of the following: (i) the number of the distinct values (nodes), including origination nodes and destination nodes, in the one or more recursion trees (NUV(C1∩C2)) that represent an intersection of two or more columns (e.g. C1 and C2) involved in at least one join operation of the recursive database query, and (ii) an average number of incoming edges of the nodes of the one or more recursion trees ("Avg_inDegree").

The estimated average of the incoming edges of the nodes of the one or more recursion trees (Avg_inDegree) can, for example, be determined at least partly based on one or more of the following: (i) a number of total rows (R) representing number of rows (i.e. edges) in one or more graph tables corresponding to the one or more recursion trees that represent the organization of data involved in the database query, and (ii) number of unique values of destination nodes of the one or more recursion trees that represent the organization of data involved in the database query ("NUV(C1)"), where the self join is defined on C1.

The estimated average number of the incoming edges of the nodes of the one or more recursion trees (Avg_inDegree)

can, for example, be determined at least partly based on division of R by NUV(C1), or (R/NUV(C1)).

The estimated average of the outgoing edges of the nodes of the one or more recursion trees (Avg_outDegree) can, for example, be determined at least partly based one or more of the following: (i) a number of total rows (R) representing number of rows in one or more graph tables corresponding to the one or more recursion trees that represent the organization of data involved in the database query, and (ii) the number of unique values of one or more of source nodes of the one or more recursion trees that represent the organization of data involved in the database query (NUV(C2)).

It should be noted that the estimated average of the outgoing edges of the nodes of the one or more recursion trees (Avg_outDegree) can, for example, be determined at least partly based on division of R by NUV(C2), or (R/NUV(C2)).

To further elaborate, it should be noted that evaluating recursive database queries can be viewed as traversing a graph which is represented as an edge stored in the base graph table on which the recursive database query is expressed. More specifically, starting from a given set of nodes, referred to here as the seeds of the recursive traversal, a recursive query generates a set of traversal edges representing all the set of nodes reachable from each seed at 1, 2, . . . n traversal iterations. In terms of execution of a recursive query in a relational database, every traversal iteration (aka recursive step) can be a self-join of previous iterations' result and the base graph table. Although the recursive steps could include filters and other operations during the generation of reachable edges at a particular iteration, these cases can be readily incorporated into the number of unique values determination by the RQO.

Given the above characterization of recursive database queries and focusing on a single seed, the recursive result can be viewed as representing a directed traversal tree rooted at the seed. These traversal trees can be referred to as recursion trees. Note that the union of these recursion trees is essentially a transitive closure. As such, the total number of self-joins can be estimated based on calculating the average depth of a recursion tree. Specifically, for a table (C1,C2) representing a graph, the following parameters can be obtained (e.g., determined, received): an estimate for the size of the transitive closure, i.e., sum of the number of internal nodes, denoted by I, of all recursion trees, (ii) an average out-degree of the graph denoted by "Avg_outDegree", and (iii) A number of starting nodes, denoted by S which depending on the database recursive query can, for example, be the size of the seed or the value of NUV(C2) which will be further discussed below.

Given the parameters noted above, the expected recursion depth of a recursion tree ENI can, for example, be determined as:

$$ENI = \frac{I}{Avg\_outDegree * S}.$$

It should be noted that the fraction I/S can be the expected number of internal nodes in the traversal tree rooted at a single seed assuming a uniform distribution of internal node's size over seeds. Dividing this value by the "Avg_outDegree" can yield the expected depth of a recursion tree assuming a uniform out degree distribution.

Each of the parameters noted above can, for example, be computed based on demographics collected for the corresponding graph table(s). To estimate the number internal nodes (I), NUV(C1) can be the number of unique values of column C1 stored in the table demographics, NUV(C2) can be the number of unique values of column C2 stored in the table demographics, NUV(C1∩C2) can be the of the size of distinct internal nodes in the graph, which is equal to the size of the intersection of the two joined columns, "Avg_inDegree" can be the average number of rows for each distinct C1 value, assuming that the self-join is defined over C1 of the graph table, and R can be the number of rows in the graph table.

Then, I can be computed as: I=NUV(C1∩C2)* Avg_inDegre, and, the Average in-Degree can be estimated as:

$$Avg\_inDegree = \frac{R}{NUV(C1)}.$$

NUV(C1∩C2) can be determined in multiple ways including computation during statistics collection on the graph table or using a sampling technique.

It should be noted that assuming all the nodes have just one incoming edge (i.e. every value in C1 is distinct), then the size of the transitive closure can be estimated by the number of internal nodes in the graph (plus the seed). This value can then be multiplied by the "Avg_inDegree" in order to get an estimate of the transitive closure.

The average out-degree, "Avg_outDegree", used in the computation of ENI can be computed as:

$$Avg\_outDegree = \frac{R}{NUV(C2)}.$$

It should be noted that this value can be related to join selectivity of the self-join in that the average degree can be estimated by Join_selectivity*R.

Figure 4:
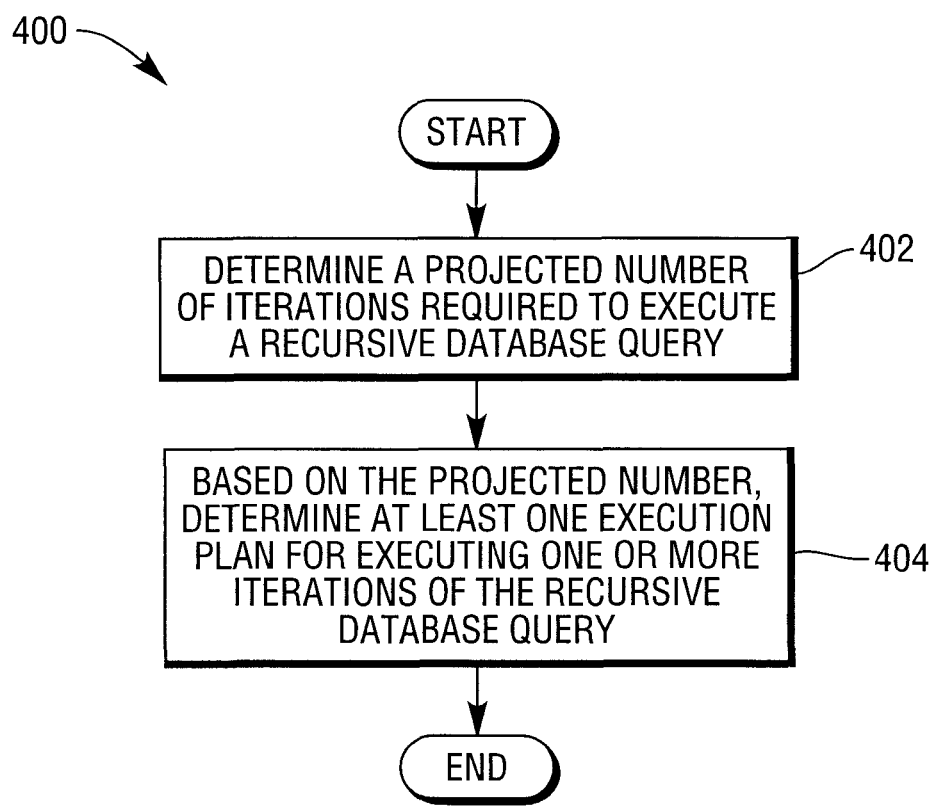
FIG. 4 depicts a method for determining an execution plan for a database query of a database in accordance with one embodiment of the invention.

To elaborate even further, FIG. 4 depicts a method 400 for determining an execution plan for a database query of a database in accordance with one embodiment of the invention. Typically, the database query requires multiple sub-queries to be executed as multiple iterations such that a result of a first one of the sub-queries is needed to be determined in a first iteration of the iterations in order to determine the result of a second one of the sub-quires in a second iteration of the iterations to be performed after the first iteration. Method 400 can, for example, be used by a device and/or the Recursive Query Optimizer (RQO) 102 depicted in FIG. 3.

Referring to FIG. 4, a projected number of iterations for the iterations required to execute the recursive database query is determined (402). Then, at least one execution plan for executing one or more iterations is determined (404) at least partly based on the projected number of iterations before the method 400 ends. For example, an execution plan can be generated, selected, or identified (404) based on the projected number of iterations. As an example, a projected number of iterations (e.g., 12) can be divided by a number determined for a system (e.g., 3) in order to determine that an execution plan is to be generated for a determined number of iterations, for example, the first four (4) iterations, and so on.

Figure 5:
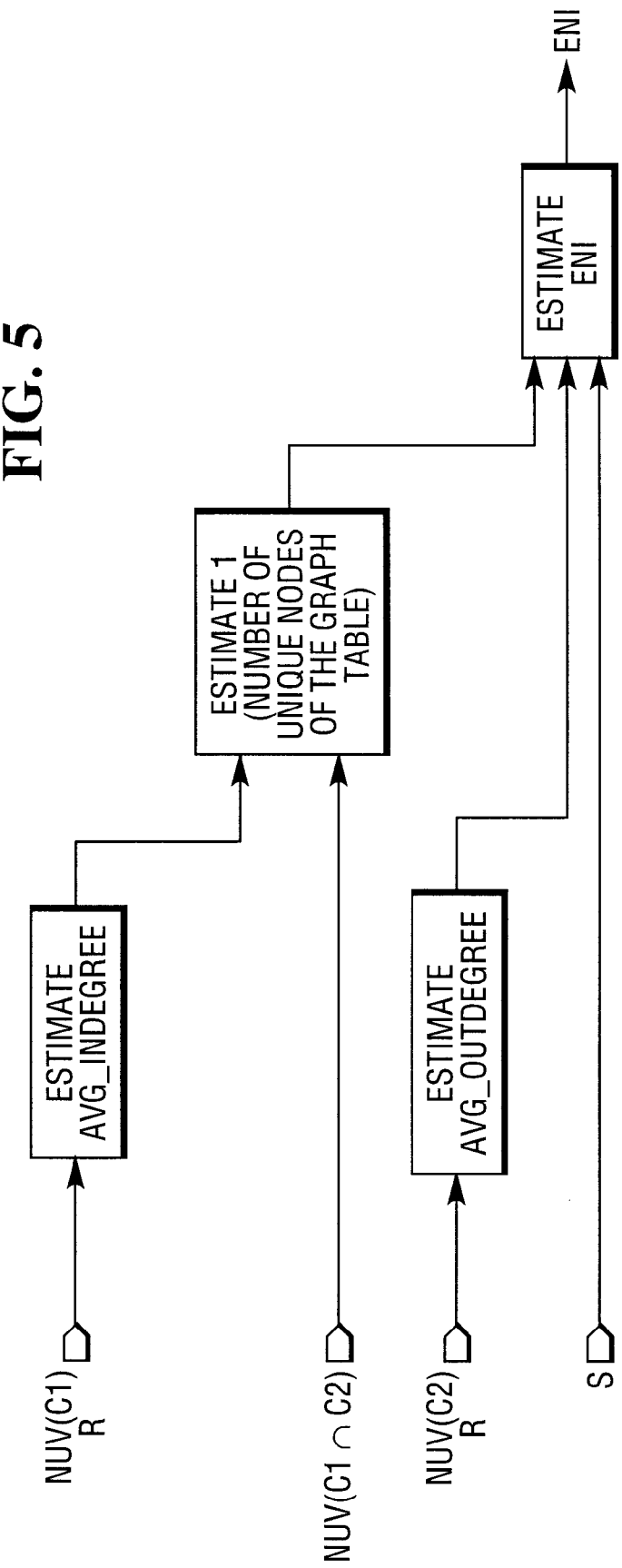
FIG. 5 depicts a method for estimating expected number of iterations (ENI) of a recursive query in accordance with one embodiment of the invention.

FIG. 5 depicts a method for estimating expected number of iterations (ENI) of a recursive query in accordance with one embodiment of the invention. Method 400 can, for example, be used by a device and/or the Recursive Query Optimizer (RQO) 102 depicted in FIG. 3. Referring to FIG. 5, an average number of incoming edges of the nodes of the one or more recursion trees ("Avg_inDegree") can be estimated and used in conjunction with the number of the distinct values (nodes), including origination nodes and destination nodes, in the one or more recursion trees (NUV(C1∩C2)) that represent an intersection of two or more columns (e.g. C1 and C2) involved in at least one join operation of the recursive database query, in order to estimate the Number of unique nodes of the graph table (I). The estimated value of (I) can be used with an estimated value of the average of the outgoing edges of the nodes of the one or more recursion trees ("Avg_outDegree") with a number of starting nodes (S) in order to determine the expected number of iterations (ENI).

It should be noted that techniques noted above are especially useful for large database systems, including single or multi-node, parallel database systems. A multi-node parallel database system can, for example, use a massively parallel processing (MPP) architecture or system to perform various database operations in parallel.

Figure 6:
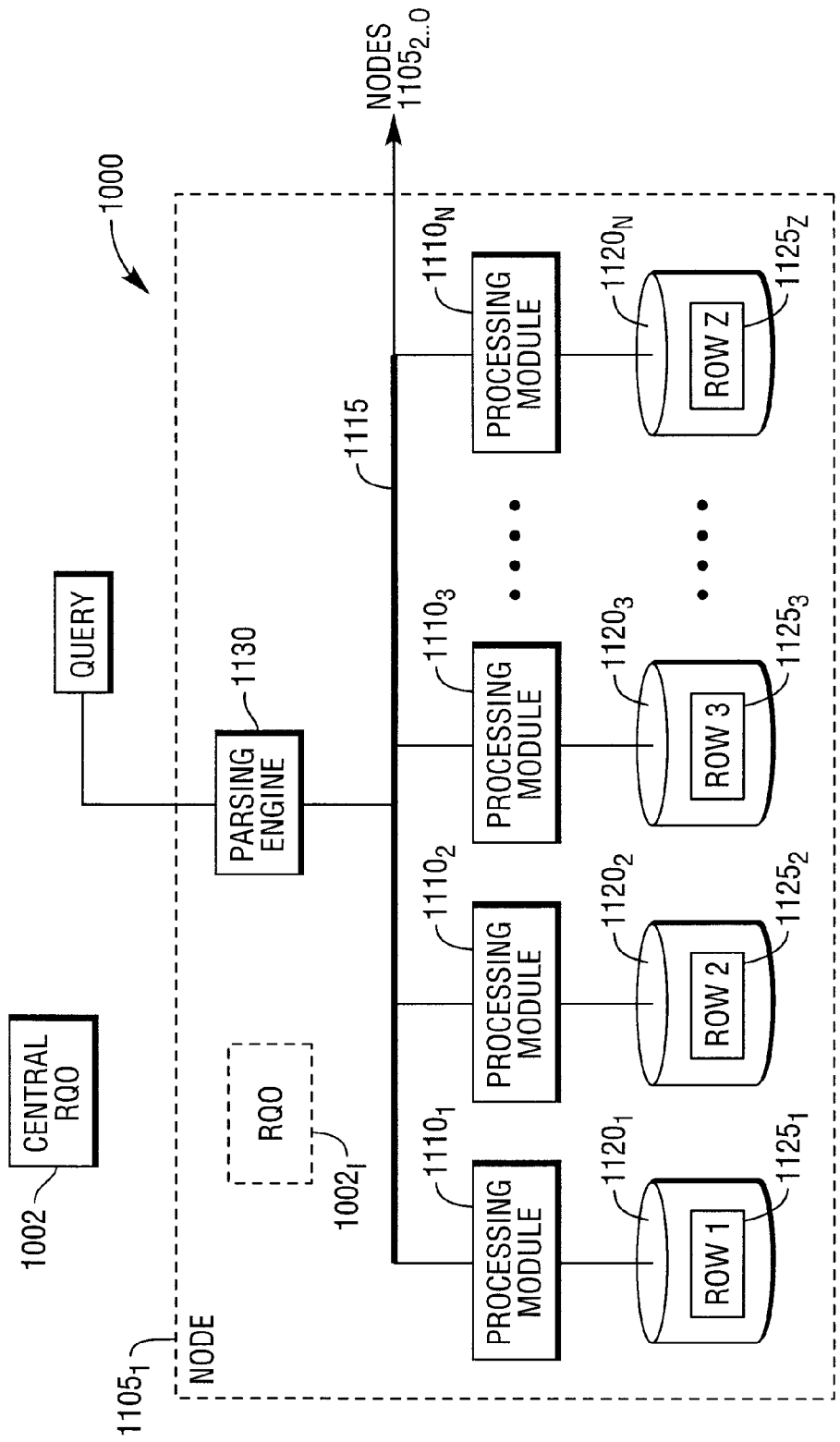
FIG. 6 depicts a database node of a database system or a Database Management System (DBMS) in accordance with one embodiment of the invention.

To further elaborate, FIG. 6 depicts a database node 1105 of a database system or a Database Management System (DBMS) 1000 in accordance with one embodiment of the invention. The DBMS 1000 can, for example, be provided as a Teradata Active Data Warehousing System. It should be noted that FIG. 5 depicts in greater detail an exemplary architecture for one database node $1105_1$ of the DBMS 1000 in accordance with one embodiment of the invention.

Referring to FIG. 6, the DBMS node $1105_1$ includes multiple processing units (or processing modules) 1110-N connected by a network 1115, that manage the storage and retrieval of data in data-storage facilities $1120_{1-N}$. Each of the processing units 1110-N can represent one or more physical processors or virtual processors, with one or more virtual processors (e.g., an Access Module Processer (AMP)) running on one or more physical processors in a Teradata Active Data Warehousing System). For example, when provided as AMPs, each AMP can receive work steps from a parsing engine (PE) 1130 which is also described below.

In the case in which one or more virtual processors are running on a single physical processor, the single physical processor swaps between the set of N virtual processors. For the case in which N virtual processors are running on an M-processor node, the node's operating system can schedule the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing units $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). Again, it should be noted that the DBMS 1000 may include additional database nodes $1105_{2-O}$ in addition to the database node $1105_1$. The additional database nodes $1105_{2-O}$ can be connected by extending the network 1115. Data can be stored in one or more tables in the data-storage facilities $1120_{1-N}$. The rows $1125_{1-z}$ of the tables can, for example, be stored across multiple data-storage facilities $1120_{1-N}$ to ensure that workload is distributed evenly across the processing units $1110_{1-N}$. In addition, a parsing engine 1130 can organize the storage of data and the distribution of table rows $1125_{1-z}$ among the processing units $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as, for example, SQL. Parsing engine 1130 can also handle logons, as well as parsing the SQL requests from users, turning them into a series of work steps that can be sent to be executed by the processing units $1110_{1-N}$.

For example, a client-side Host 1004 (e.g., a Personal Computer (PC), a server) can, be used to logon to the database system 1000 provided as a Teradata DBS server. Commination between the client-side Host 1004 and the database system 1000 can be facilitated by a database communicating mechanism, for example, by an ANSI CLI (Call Level Interface) standard that can include parcel requests and responses that facilitate the movement of files resident on the client-side host 1004 over to the database system 1000.

For example, the rows $1125_{1-z}$ can be distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index may be called the hash function. Some portion, possibly the entirety, of the hash value can be designated a "hash bucket". As such, the hash buckets can be assigned to data-storage facilities $1120_{1-N}$ and associated processing units $1110_{1-N}$ by a hash bucket map. The characteristics of the columns chosen for the primary index determine how evenly the rows are distributed.

Referring again to FIG. 6, it should be noted that a Recursive Query Optimizer (RQO) 1002 can be provided for the database node $1105_1$. The RQO 1002 can be act as a central component. However, it should be noted that each one of the processing units $1110_{1-N}$ can be effectively provided with a local Optimizer (RQO) $1002_{1-N}$ that can serve as a local component and possibly collaborate with the RQO 1002. Of course, various other configurations are possible and will become readily apparent in view of the foregoing.

Additional techniques for optimization of recursive or iterative database queries are also described in patent application Ser. No. 13/721,901 entitled "CARDINALITY ESTIMATION FOR OPTIMIZATION OF RECURSIVE OR ITERATIVE DATABASE QUERIES BY DATABASES," which is hereby incorporated by reference herein in its entirety and for all purposes.

Techniques for optimization of recursive or iterative database queries are also described in patent application Ser. No. 13/722,068 entitled "ADAPTIVE OPTIMIZATION OF ITERATIVE OR RECURSIVE QUERY EXECUTION BY DATABASES," which is hereby incorporated by reference herein in its entirety and for all purposes.

Generally, various aspects, features, embodiments or implementations of the invention described above can be used alone or in various combinations. Furthermore, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method, implemented at least partly by a device, for facilitating execution of a database query of a database, wherein the database query requires multiple sub-queries to be executed as multiple iterations such that a result of a first one of the sub-queries is needed to be determined in a first iteration of the iterations in order to determine a result of a second one of the sub-queries in a second iteration of the iterations to be performed after the first iteration, and wherein the method comprises:

estimating a projected number of iterations required to execute the database query including the first and second iterations at least partly by determining the projected number of iterations at least partly based on the following: (i) an estimated number of all nodes in one or more recursion trees (I) that represent the organization of data involved in the database query, (ii) the number of nodes in the one or more recursion trees that originate at a seed (S) provided as input of the database query, and (iii) an estimated average of the outgoing edges of the nodes of the one or more recursion trees (Avg_outDegree); and determining at least one execution plan for executing one or more of the iterations, at least partly based on the projected number of iterations required to execute the database query.

2. The method of claim 1, wherein the determining of the at least one execution plan for executing the one or more of the iterations comprises:

determining the projected number of iterations and/or self joins planned by the at least one execution.

3. The method of claim 1, wherein the estimating of the projected number of iterations further comprises:

determining the projected number of iterations at least partly based on the ratio of the estimated number of all nodes and a product of the seed and the Avg_outDegree (I/(S*Avg_outDegree)).

4. The method of claim 3, wherein the estimating number of all nodes in one or more recursion trees (I) that represent the organization of data involved in the database query is determined at least partly based on one or more of the following: (i) the number of the distinct nodes, including origination nodes and destination nodes, in the one or more recursion trees (NUV(C1∩C2)) that represent an intersection of two or more columns involved in at least one join operation of the database query, and (ii) an average number of incoming edges of the nodes of the one or more recursion trees (Avg_inDegree).

5. The method of claim 4, wherein the estimated average of the incoming edges of the nodes of the one or more recursion trees (Avg_inDegree) is determined at least partly based one or more of the following: (i) a number of total rows (R) representing number of rows in one or more graph tables corresponding to the one or more recursion trees that represent the organization of data involved in the database query, and (ii) number of unique values of destination nodes of the one or more recursion trees that represent the organization of data involved in the database query (NUV(C1)).

6. The method of claim 4, wherein the estimated average of the incoming edges of the nodes of the one or more recursion trees (Avg_inDegree) is determined at least partly based on division of total number of rows R by NUV(C1).

7. The method of claim 1, wherein the estimated average of the outgoing edges of the nodes of the one or more recursion trees (Avg_outDegree) is determined at least partly based one or more of the following: (i) a number of total rows (R) representing number of rows in one or more graph tables corresponding to the one or more recursion trees that represent the organization of data involved in the database query, and (ii) the number of unique values of one or more of source nodes of the one or more recursion trees that represent the organization of data involved in the database query (NUV(C2)).

8. The method of claim 1, wherein the estimated average of the outgoing edges of the nodes of the one or more recursion trees (Avg_outDegree) is determined at least partly based on (R/NUV(C2)).

9. A device that includes one or more processors configured to:

estimate a projected number of iterations required to execute a database query that requires multiple sub-queries to be executed as multiple iterations such that a result of a first one of the sub-queries is needed to be determined in a first iteration of the iterations in order to determine a result of a second one of the sub-queries in a second iteration of the iterations to be performed after the first iteration; wherein the estimating comprises determining the projected number of iterations at least partly based on: (i) an estimated number of all nodes in one or more recursion trees (I) that represent the organization of data involved in the database query, (ii) the number of nodes in the one or more recursion trees that originate at a seed (S) provided as input of the database query, and (iii) an estimated average of the outgoing edges of the nodes of the one or more recursion trees (Avg_outDegree); and determine at least one execution plan for executing one or more of the iterations, at least partly based on the projected number of iterations required to execute the database query.

10. A non-transitory computer readable storage medium storing at least executable code for facilitating execution of a database query of a database, wherein the database query requires multiple sub-queries to be executed as multiple iterations such that a result of a first one of the sub-queries is needed to be determined in a first iteration of the iterations in order to determine a result of a second one of the sub-queries in a second iteration of the iterations to be performed after the first iteration, and wherein the executable code includes:

executable code for estimating a projected number of iterations required to execute the database query including the first and second iterations at least partly by determining the projected number of iterations at least partly based on: (i) an estimated number of all nodes in one or more recursion trees (I) that represent the organization of data involved in the database query, (ii) the number of nodes in the one or more recursion trees that originate at a seed (S) provided as input of the database query, and (iii) an estimated average of the outgoing edges of the nodes of the one or more recursion trees (Avg_outDegree); and executable code for determining at least one execution plan for executing one or more of the iterations, at least partly based on the projected number of iterations required to execute the database query.

* * * * *